United States Patent
Workman, Jr. et al.

(10) Patent No.: US 9,546,903 B2
(45) Date of Patent: *Jan. 17, 2017

(54) DATA KNITTING TANDEM DISPERSIVE RANGE MONOCHROMATOR

(71) Applicant: WESTCO SCIENTIFIC INSTRUMENTS, INC, Brookfield, CT (US)

(72) Inventors: Jerome J. Workman, Jr., Danbury, CT (US); Tushar Saraf, Brookfield, CT (US); Thomas Andrew Bennett, Brookfield, CT (US)

(73) Assignee: WESTCO SCIENTIFIC INSTRUMENTS, INC, Brookfield, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/185,818

(22) Filed: Jun. 17, 2016

(65) Prior Publication Data

US 2016/0299005 A1  Oct. 13, 2016

Related U.S. Application Data

(63) Continuation of application No. 14/603,700, filed on Jan. 23, 2015, now Pat. No. 9,395,245, which is a
(Continued)

(51) Int. Cl.
  *G01J 3/28* (2006.01)
  *G01J 3/18* (2006.01)
  *G01J 3/02* (2006.01)

(52) U.S. Cl.
  CPC ............... *G01J 3/18* (2013.01); *G01J 3/0202* (2013.01); *G01J 3/027* (2013.01); *G01J 2003/1866* (2013.01)

(58) Field of Classification Search
  CPC .............. G01J 3/02; G01J 3/18; G01J 3/2803; G01J 3/2823; G01J 3/28
  See application file for complete search history.

(56) References Cited

U.S. PATENT DOCUMENTS 4,804,266 A * 2/1989 Barshad ................... G01J 3/06
                                                              356/308
5,015,069 A   5/1991 Bryan et al.
(Continued)

OTHER PUBLICATIONS

Luca Poletto, Off-axis pivot mounting for aberration-corrected concave gratings at normal incidence, Applied Optics, vol. 39, No. 7, Mar. 1, 2000.

*Primary Examiner* — Tarifur Chowdhury
*Assistant Examiner* — Md M Rahman
(74) *Attorney, Agent, or Firm* — Thomas | Horstmeyer, LLP; Jason M. Perilla

(57) ABSTRACT

Aspects of a tandem dispersive range monochromator and data knitting for the monochromator are described herein. In one embodiment, the monochromator includes a tandem diffraction grating, a grating drive motor that rotates the tandem diffraction grating to provide, by diffraction of broadband light, first dispersed wavelengths of light and second dispersed wavelengths of light, a detector that detects a first reflection from the first dispersed wavelengths of light and a second reflection from the second dispersed wavelengths of light, and processing circuitry that knits together data values from the first reflection and data values from the second reflection to provide a spectrum of combined data values. By using a tandem diffraction grating having different dispersive surfaces, measurements of relatively high precision and quality may be taken throughout a wider spectral range, and the measurements may be knitted together to provide a spectrum of combined data values.

17 Claims, 11 Drawing Sheets

Related U.S. Application Data continuation-in-part of application No. 14/213,214, filed on Mar. 14, 2014, now Pat. No. 9,404,799.

(60) Provisional application No. 61/792,209, filed on Mar. 15, 2013.

(56) References Cited

U.S. PATENT DOCUMENTS

| | | | |
|---|---|---|---|
| 5,096,295 A * | 3/1992 | Krupa | G01J 3/06 356/334 |
| 5,359,409 A * | 10/1994 | Wildnauer | G01J 3/18 356/328 |
| 5,373,359 A | 12/1994 | Woollam | |
| 5,488,240 A * | 1/1996 | Hlousek | G01J 3/18 250/231.16 |
| 7,483,134 B2 | 1/2009 | Toth et al. | |
| 2002/0044280 A1* | 4/2002 | Weigold | G01J 3/2889 356/326 |
| 2006/0176480 A1 | 8/2006 | Toth | |
| 2008/0204711 A1 | 8/2008 | Harrison | |
| 2010/0073667 A1 | 3/2010 | Cyr | |
| 2012/0262713 A1 | 10/2012 | Florek | |

* cited by examiner

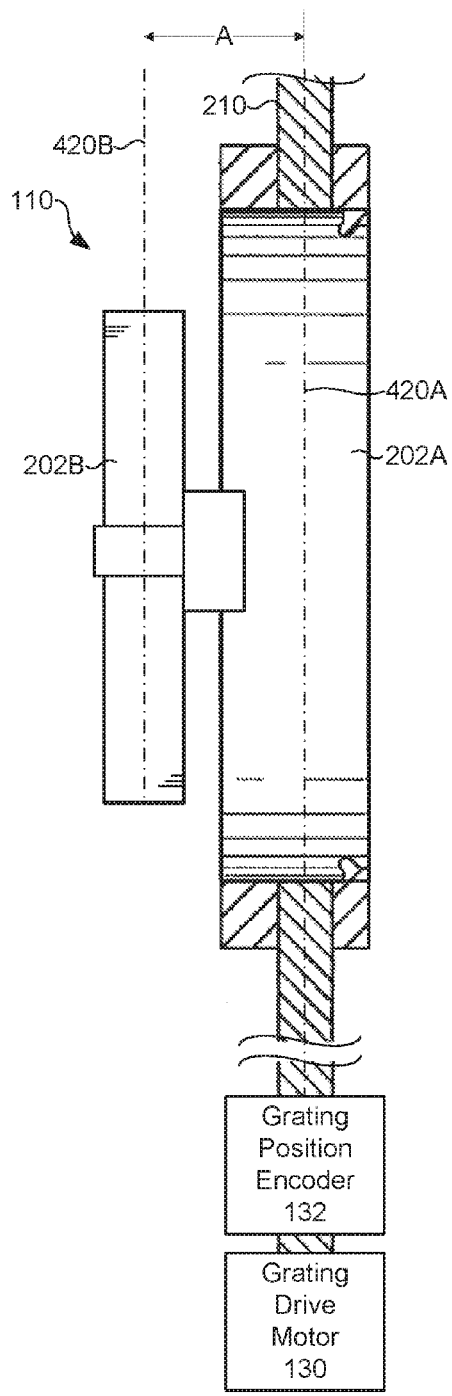
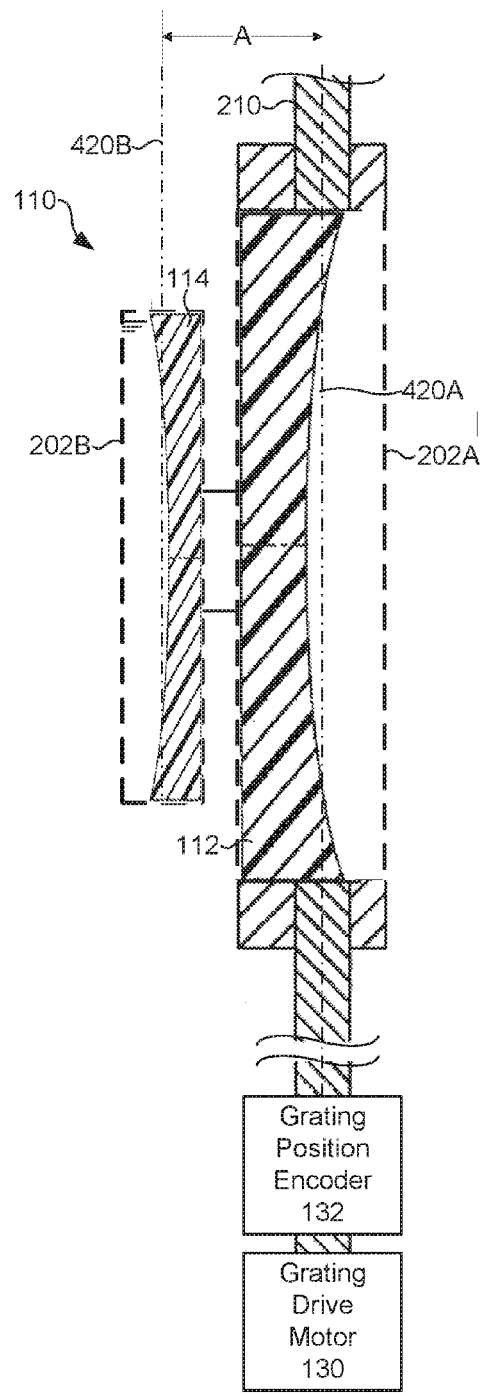
FIG. 4A
FIG. 4B

*0°/45°*

*45°/0°*

*22.5°/
22.5°*

DATA KNITTING TANDEM DISPERSIVE RANGE MONOCHROMATOR

CROSS-REFERENCE TO RELATED APPLICATIONS

This application is a continuation of U.S. Non-provisional application Ser. No. 14/603,700, filed Jan. 23, 2015, which is a continuation in part of U.S. Non-provisional application Ser. No. 14/213,214, filed Mar. 14, 2014, which claims the benefit of U.S. Provisional Application No. 61/792,209, filed Mar. 15, 2013, the entire content of all of which applications are hereby incorporated herein by reference.

BACKGROUND

Monochromators are optical instruments used to separate monochromatic light from a wider range of wavelengths of light. To spatially separate colors or bands of broadband light, a monochromator may rely upon optical dispersion by way of a prism or diffraction by way of a diffraction grating. Grating monochromators may disperse broadband light over a certain range of wavelengths, such as ultraviolet, visible, or infrared, for example, using replica gratings.

BRIEF DESCRIPTION OF THE DRAWINGS

Aspects of the embodiments described herein can be better understood with reference to the following drawings. The elements in the drawings are not necessarily to scale, with emphasis instead being placed upon clearly illustrating the principles of the embodiments. Additionally, certain dimensions or positionings may be exaggerated to help visually convey certain principles. In the drawings, similar reference numerals between figures designate like or corresponding, but not necessarily the same, elements.

FIG. 4A illustrates a side view of the tandem diffraction grating of FIG. 3 according to an embodiment described herein.

FIG. 4B illustrates a cutaway side view of the tandem diffraction grating of FIG. 3 according to an embodiment described herein.

DESCRIPTION

Monochromators generally rely upon optical dispersion provided by a prism or a diffraction grating. In this context, it is noted that prisms and diffraction gratings can be used to spatially separate colors into separate wavelengths of broadband or white light. A diffraction grating comprises an optical element having a periodic structure that separates and diffracts broadband light into its constituent wavelength components. The components may be separated in direction after reflection, based on a spacing of the periodic structure of the grating, for example.

A tandem dispersive range monochromator and certain elements thereof are described herein. The monochromator includes a tandem diffraction grating and is configured for use over a wide spectral range, such as a range including both the color and near infrared or infrared spectrums. By using a tandem diffraction grating having different dispersive surfaces, measurements of relatively high precision and quality may be taken throughout a wider spectral range. In this context, a tandem or doublet diffraction grating that relies upon a single optical train for relatively high precision and quality spectral measurements is described.

In one embodiment described herein, a tandem dispersive range monochromator and data knitting for the monochromator are described herein. In one embodiment, the monochromator includes a tandem diffraction grating, a grating drive motor that rotates the tandem diffraction grating to provide, by diffraction of broadband light, first dispersed wavelengths of light and second dispersed wavelengths of light, a detector that detects a first reflection from the first dispersed wavelengths of light and a second reflection from the second dispersed wavelengths of light, and processing circuitry that knits together data values from the first reflection and data values from the second reflection to provide a spectrum of combined data values. By using a tandem diffraction grating having different dispersive surfaces, measurements of relatively high precision and quality may be taken throughout a wider spectral range, and the measurements may be knitted together to provide a spectrum of combined data values. In another aspect, the processing circuitry controls a sample drive motor to vary an angle of incidence of the dispersed wavelengths of light onto a sample for evaluation.

In the following description, a general description of a tandem dispersive range monochromator and its elements is provided, followed by a discussion of the operation of the same.

Figure 1:
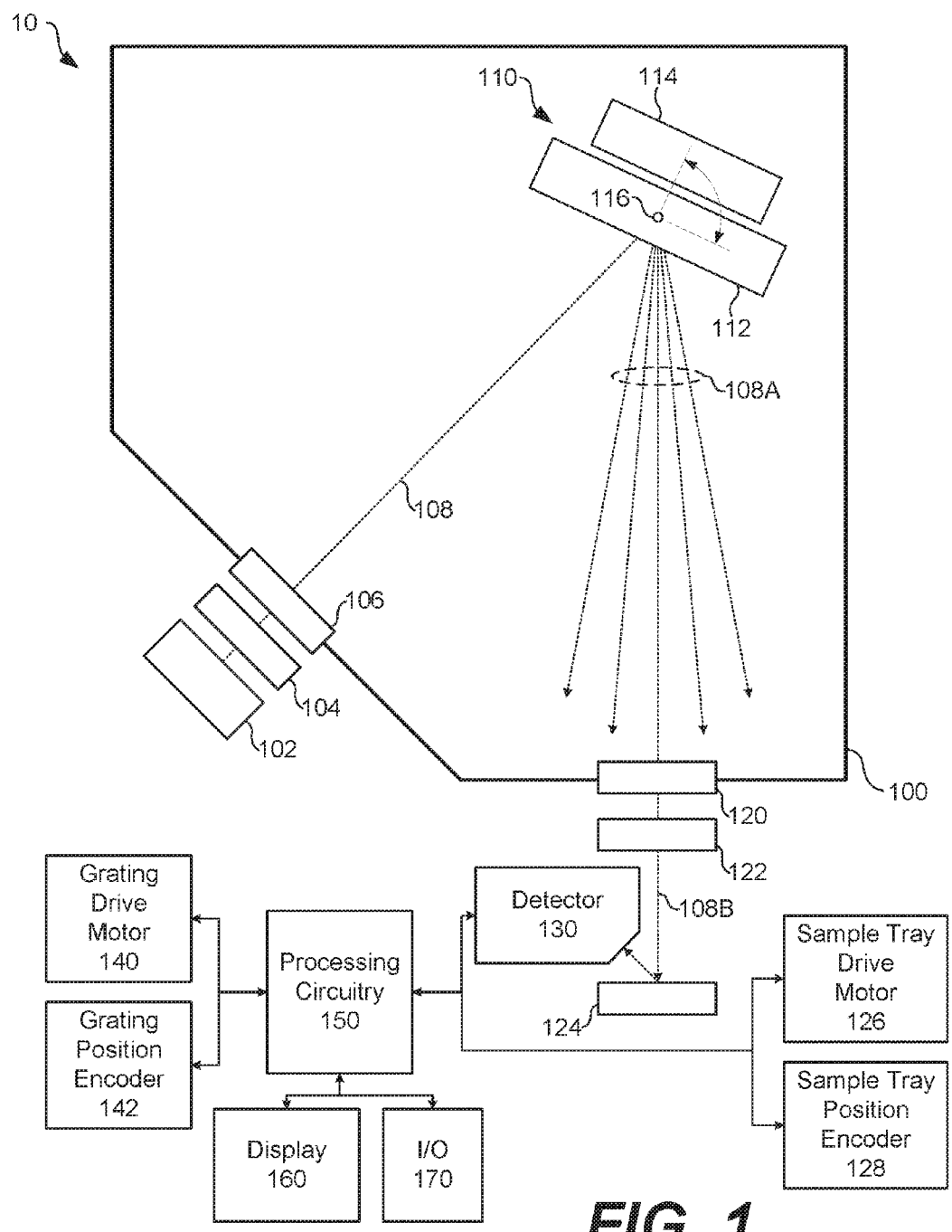
FIG. 1 illustrates an example tandem dispersive range monochromator including a tandem diffraction grating according to an embodiment described herein.

FIG. 1 illustrates an example tandem dispersive range monochromator 10 including a tandem diffraction grating 110 according to an embodiment described herein. The monochromator 10 is enclosed in a housing (not shown), within which one or more platforms or other supporting means are relied upon to mount and support the elements described herein. As illustrated, the monochromator 10 includes an enclosure 100 for the tandem diffraction grating assembly 110. The enclosure 100 may be embodied as one or more walls and/or baffles, for example, which restrict the entry and/or exit of stray light, but is not limited to any size, shape, or construction.

Among other elements, the monochromator 10 further includes a light source assembly 102, an entrance optics assembly 104, an entrance slit assembly 106, an exit slit assembly 120, an exit optics assembly 122, a sample tray 124, a sample tray drive motor 126, a sample tray position encoder 128, a detector 130, a grating drive motor 140, a grating position encoder 142, processing circuitry 150, a display 160, and input/output (I/O) interfaces 170. As described in further detail below, among other functions, the processing circuitry 150 controls the grating drive motor 140 to rotate the tandem diffraction grating 110 over different dispersive side surfaces about a pivot point 116, to disperse broadband light over a wider range of wavelengths more accurately than would be possible with a single dispersive side surface. The processing circuitry 150 may also knit together data values across first and second spectrums to provide a spectrum of combined data values and display the spectrum of combined data values on the display 160.

In one embodiment, the light source assembly 102 includes a halogen light bulb, although any source of broadband light suitable for the application may be relied upon among embodiments. The entrance optics assembly 104 may include optical elements that collimate the broadband light, such as one or more spaced-apart expander and/or plano-convex lenses or other elements, without limitation. The entrance slit assembly 106 includes a slit though which at least a portion of the broadband light 108 may be selectively passed into the enclosure 100. Among embodiments, the size of the entrance slit may be selected for suitable performance of the monochromator 10, and the slit may be selectively covered and/or uncovered by a sliding shutter (not shown) driven by an offset solenoid (not shown), for example. Any suitable shutter mechanism may be used for this purpose. The shuttering operation of the solenoid may be controlled by the processing circuitry 150, for example, during various operations of the monochromator 10, such as dark scan, calibration (or reference) scan, and live scan operations, for example.

Within the enclosure 100, the tandem diffraction grating 110 is mounted to rotate about the pivot point 116 by way of the grating drive motor 140. Thus, the tandem diffraction grating 110 can be rotated under the control of the processing circuitry 150, as described herein. In one embodiment, the tandem diffraction grating 110 includes a first ultra-violet (UV) to visible (VIS) grating 112 and a second near-infrared (NIR) to infrared (IR) grating 114. In other embodiments, the tandem diffraction grating 110 may include more than two dispersive gratings. For example, the tandem diffraction grating 110 may include three or more dispersive gratings, each selected to disperse a particular range of wavelengths of light. It is also noted that the tandem diffraction grating 110 may take various forms and/or shapes other than that illustrated in the figures, and the relative positions of the first UV-VIS and second NIR-IR gratings 112 and 114 may be reversed or otherwise altered.

The diffraction gratings described herein may be embodied as substrates of various sizes with parallel grooves replicated on their surfaces, as would be appreciated in the art. A diffraction grating, such as the gratings 112 and 114, disperses broadband light 108 by spatially separating it according to wavelength, resulting in first dispersed wavelengths of light 108A and second dispersed wavelengths of light 108C (FIG. 2), respectively. Various methods of manufacture of diffraction gratings are known in the field, and the diffraction gratings described herein may be manufactured using any known method, such as by replication from master gratings, interferometric control, holographic generation, ion etching, or lithography, for example. Diffraction gratings may also include a coating of reflective material over the grooves, to reflect light.

In various embodiments, the first and second diffraction gratings 112 and 114 may be selected for use over any desired range of wavelengths and sourced from any manufacturer of diffraction gratings, such as Optometrics Corporation of Littleton, Mass., Grating Works of Acton, Mass., or Richardson Gratings™ of Rochester, N.Y., for example and without limitation. One example of a diffraction grating for use with near IR wavelengths is a Hitachi Holographic Grating with a groove density of about 600 grooves per mm, although it should be appreciated that the use of other diffraction gratings is within the scope and spirit of the embodiments.

Certain diffraction gratings have specific, blazed efficiency curves. The choice of an optimal efficiency curve for a grating depends on the specific application. In the context of a monochromator, linear efficiency is usually desired. In other words, the intensity of the diffracted bands of light should be constant across the spectral range of light being dispersed. It is noted, however, that the efficiency (e.g., the power or intensity of monochromatic light diffracted relative to the intensity of the incident light) of a diffraction grating is generally not constant as the angle of incident light upon the grating is varied. In other words, as a diffraction grating is rotated in the presence of incident light upon its surface, the intensity and/or linearity of the diffracted bands of light may not be perfectly uniform. This lack of uniformity generally results in some measure of error or increased signal-to-noise ratio in measurements taken by monochromators.

It should also be appreciated that this variation in the output of diffracted bands of light during scanning varies respectively among different diffraction gratings. In this context, according to certain aspects of the embodiments described herein, variations in the intensity and/or linearity of the diffracted bands of light (and other operating factors) for each of the gratings 112 and 114, respectively, is compensated for (at least in part) by individual control of the rate of angular velocity or displacement of the gratings 112 and 114. More particularly, the rate of angular velocity or displacement for the first diffraction grating 112 of the tandem grating 110 may be different than that for the second diffraction grating 114 of the tandem grating 110.

Further, according to aspects of the embodiments described below with reference to FIGS. 4A and 4B, the rate of angular velocity or displacement for the first diffraction grating 112 may be different than that for the second diffraction grating 114, to take into account an offset distance between the pivot point 116 of the tandem grating 110, which may be coincident to the surface of the first diffraction grating 112, and a surface of the second diffraction grating 114. This varied or variable angular rate control aspect is unique because conventional drive systems generally operate at the same speed over both the UV-VIS and NIR-IR spectral regions. The direct and computer controlled drive system described herein may be modified for variable scan rates and numbers of sweeps depending upon signal-to-noise and dispersive grating specifications.

Additionally, according to other aspects of the embodiments described below with reference to FIGS. 6B, 7, 8A, 8B, and 9, the variations in the intensity and/or linearity of the diffracted bands of light (and other operating factors) from the gratings 112 and 114 may be compensated for (at least in part) by knitting data values together. More particularly, the processing circuitry 150 may knit together first data values detected by the detector 130 using light from the first diffraction grating 112 and second data values detected by the detector 130 using light from the second diffraction grating 114, to provide an aligned and smoothed spectrum of combined data values for storage and/or display on the display 160.

Referring again to FIG. 1, after being reflected from the first diffraction grating 112 of the tandem diffraction grating 110, the exit slit assembly 120 passes a first portion 108B of the first dispersed wavelengths of light 108A out from the enclosure 100. The exit slit assembly 120 may include a physical slit in the enclosure 100 through which the first portion 108B of light may pass. In some embodiments, rather than a physical slit, the exit slit could be an electronic slit, such as a liquid crystal, LCD, or similar device that may be turned off or on to either block or transmit light through a virtual aperture of a particular shape and size. As another example, a fiber optic may be used to construct a slit for a specific type of detection system. In effect, any suitable structure may be used for restricting the shape and/or size of the dispersed monochromatic light that reaches the detector 130.

The exit optics assembly 122 includes optical elements that collect the first portion 108B of light, such as one or more plano-convex collection lenses, for example, without limitation. In some embodiments, the exit optics assembly 122 may also include one or more 45° mirrors, etc., to further direct the first portion 108B of light within the monochromator 10.

After being collected and/or directed by the exit optics assembly 122, the first portion 108B of the first dispersed wavelengths of light 108A falls incident upon the sample tray 124 and/or a sample for evaluation in or on the sample tray 124. In turn, the first portion 108B of light is reflected off the sample and captured by the detector 130. In one embodiment, the detector 130 is positioned proximate to the sample tray 124 and measures the intensity of the light reflected from the sample or the fraction of radiation absorbed by the sample at specific wavelengths (i.e., the absorbance of the sample). The detector 130 further converts the first portion of reflected light to an electrical signal and/or data values from which a quantitative analysis of a variety of characteristics of the sample, including constituent analysis, moisture content, taste, texture, viscosity, etc., may be determined.

The detector 130 may include one or more lensed assemblies including one or more image or light sensors that observe the reflection of light from the sample at a point of illumination. The field of view of the detector 130 may be restricted and the relative geometry and/or placement of the one or more lensed assemblies may be selected to maximize energy collection while minimizing stray light inclusion. To further maximize energy collection by the detector 130, in certain embodiments, an order sorting filter may also be included within the entrance or exit optics assemblies 104 or 122. Further details regarding the geometry of the detector 130 and the sample tray 124 are described below with reference to FIGS. 5A-5C.

The grating drive motor 140 rotates the tandem diffraction grating 110 about the pivot point 116. The processing circuitry 150 controls the rotational angular velocity and/or acceleration of the tandem diffraction grating 110 by way of the grating drive motor 140. Because the tandem diffraction grating 110 includes two or more diffraction gratings, each having respective optical properties, the processing circuitry 150 controls the angular velocity and/or acceleration of each diffraction grating individually. Among embodiments, the grating drive motor 140 may be embodied as any suitable permanent magnet stepper motor that directly drives the rotation of the tandem diffraction grating 110, although other types of motors may be used. For example, variable reluctance motors, brushless DC motors, hybrid stepper motors, or servo motors may be relied upon. Preferably, the grating drive motor 140 is selected to provide a continuous or nearly continuous range of angular displacement with good response to control by the processing circuitry 150.

The grating position encoder 142 provides feedback on the angular orientation of the tandem diffraction grating 110. For example, the grating position encoder 142 may provide an encoded signal representative of the absolute angular orientation or position of the tandem diffraction grating 110. This position information is provided to the processing circuitry 150 as feedback for control of the grating drive motor 140. In one embodiment, the grating position encoder 142 may be selected from among any suitable rotary position encoder having high enough resolution in rotary position for the application. In one embodiment, an encoder may be selected to yield a 1 in 25,600 increment of rotation, representative of 0.1 nm of dispersed monochromatic light for certain diffraction gratings. The position or increment of rotation may be interpolated in some embodiments for even greater resolution of rotary position. One example of such a rotary position encoder is the HEIDENHAIN ERN 480 encoder unit, although other types of encoders may be relied upon among embodiments.

In one aspect, the processing circuitry 150 controls the grating drive motor 140 to regulate an angular velocity of the tandem diffraction grating 110 based on an angular orientation of the tandem diffraction grating 110. In this context, because the angular orientation of the tandem diffraction grating 110 may be used to identify which surface of the first and second diffraction gratings 112 and 114 is facing and dispersing the portion of the broadband light 108, the processing circuitry 150 can control the grating drive motor 140 to regulate an angular velocity of the tandem diffraction grating 110 accordingly. In another aspect, the processing circuitry 150 further controls the grating drive motor 140 to regulate the angular velocity of the tandem diffraction grating 110 based on the angular orientation of the tandem diffraction grating 110 and an offset distance between the pivot point 116 and a surface of the second diffraction grating 114, as further described below.

The sample tray drive motor 126 rotates the sample tray 124 about a pivot point. The processing circuitry 150 controls an angle of incidence of the first portion 108B of light upon the sample tray 124 and/or a sample in or on the sample tray 124. The sample tray position encoder 128 provides feedback on the angular orientation of the sample tray 124 to the processing circuitry 150. Generally, the sample tray position encoder 128 may be of lower rotary position resolution than that of the grating position encoder 142. The angular orientation information from the sample tray position encoder 128 is provided to the processing circuitry 150 as feedback for control of the sample tray drive motor 126. In one aspect, the processing circuitry 150 controls the sample tray drive motor 126 to adjust an angle of incidence of the first portion 108B of light upon the sample tray 124, depending upon the type of measurement being taken by the monochromator 110. Further details regarding control of the angle of incidence of the first portion 108B of light upon the sample tray 124 are described below with reference to FIGS. 5A-5C.

The processing circuitry 150 may be embodied as one or more circuits, processors, processing circuits, or any combination thereof that monitors and controls the elements of the monochromator, as described herein. In this context, the processing circuitry 150 may be configured to capture, store, and analyze signals and/or data provided by the detector 130, forward and/or display captured data to another computing device or the display 160, receive control feedback from a user operating the I/O interfaces 170, and store and process various types of data. The processing circuitry 150 may also be configured to perform the necessary calculations and output control signals to elements of the monochromator 150, so as to implement the tandem dispersive range sample scanning process 600A of FIG. 6A and the tandem dispersive range sample scanning and knitting process 600B, as further described below. Further, the processing circuitry 150 may also include driver circuitry for powering and/or driving the grating drive motor 140 and the sample tray drive motor 126, among other elements which are under computer control.

While a more detailed description of the operation of the monochromator 10 is further described below, a brief overview of the operation is described here for additional context before turning to the remaining figures. In operation, the light source of the light source assembly 102 emits a relatively broad spectrum of light or radiation. The entrance optics assembly 104 collimates the broadband light, and at least a portion of the broadband light is then projected through an entrance slit of the entrance slit assembly 106 and onto the tandem diffraction grating 112. The tandem diffraction grating 110 provides (i.e., reflects) first dispersed wavelengths of light 108A by diffraction of the portion of the broadband light incident upon it. The tandem diffraction grating 110 is positioned and rotated over time by the grating drive motor 140 so that the first portion 108B of the first dispersed wavelengths of light 108A, which varies or scans over time, passes through an exit slit of the exit slit assembly 120, while the exit assembly 120 blocks other wavelengths of the first light 108A from exiting the enclosure 100.

The first portion 108B of the first light 108A that passes through the exit slit is determined by the angle of the tandem diffraction grating 110, and a spectrum of UV-VIS and NIR-IR light is scanned by rotation of the tandem diffraction grating 110 by the grating drive motor 140. The first portion 108B of the first light 108A that passes through the exit slit is collected by the exit optics assembly 122 and directed incident onto a sample in the sample tray 124. The detector 130, which is situated proximate to the sample tray 124, measures the intensity of diffused, reflected light from the sample and converts the power of the reflected light into an electrical signal and/or data values. Using the electrical signal and/or data values, a quantitative analysis of the characteristics of the sample, such as sample constituents, moisture content, taste, texture, viscosity, etc., can be quantitatively determined.

Based on the characteristics of the tandem diffraction grating 110, the monochromator 10 provides the dispersion capability of multiple monochromators in one unit. That is, the monochromator 10 provides the dispersion capability of an ultra-violet to visible spectra monochromator and a near infrared to infrared spectra monochromator, for example, although additional or other spectral ranges are within the scope and spirit of the embodiments described. As described herein, the tandem grating 110 may be rotated about the pivot point 116 (FIG. 1) to make use of both sides of the UV-VIS and NIR-IR gratings 112 and 114.

By making use of the tandem diffraction grating 110, the monochromator 10 provides accurate dispersion capabilities over non-overlapping (or partially overlapping) spectra, to achieve wider dispersion than would otherwise be possible with a conventional (i.e., non-tandem) grating. As compared to a monochromator that includes a single, conventional grating adapted or manufactured for a relatively wide spectral range of operation, the use of the tandem grating 110 provides dispersion capabilities over at least as wide of a range (e.g., as the conventional grating), but with better precision, resolution, and/or granularity. The separate gratings allow optimization of linewidths to meet more stringent requirements for linewidth over multiple spectral regions or ranges.

Further, making use of the tandem grating 110, reliance upon two separate monochromators may be averted. Particularly, the monochromator 10 can be relied upon to make relatively high quality spectroscopic measurements over the UV-VIS-NIR-IR range of 190 nanometers to 3000 nanometers, for example. This results in less overall cost as compared to using separate monochromators, respectively, for the UV-VIS and NIR-IR ranges, in a smaller footprint. It is noted that using two monochromators may be cost and/or time prohibitive and results in energy loss for each beam, especially when additional optics must combine the beams at a sample. Also, using a single conventional grating over the full UV-VIS-NIR-IR spectral region results in insufficient quality and spectral resolution to make true color (e.g., CIE (International Commission on Illumination) Color Coordinates and L*a*b* Color Space certified measurements) and extended range NIR and IR measurements.

Figure 2:
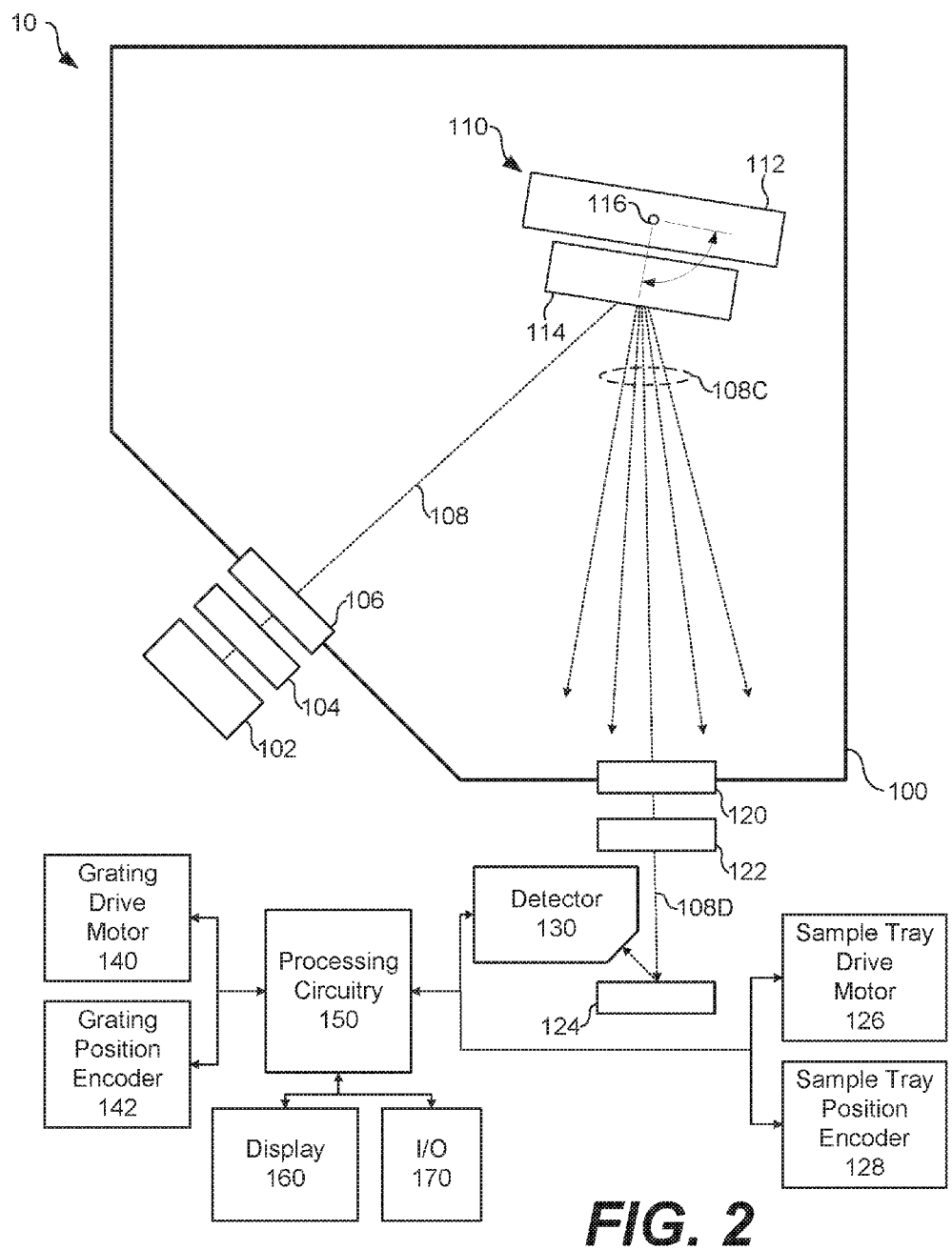
FIG. 2 illustrates the tandem dispersive range monochromator of FIG. 1 with a rotated tandem diffraction grating.

Turning to FIG. 2, the tandem dispersive range monochromator 10 of FIG. 1 is illustrated with the tandem diffraction grating 110 being rotated. In FIG. 2, the tandem diffraction grating 110 has been rotated so that the broadband light 108 is incident upon the surface of the second diffraction grating 114, rather than upon the surface of the first diffraction grating 112, as in FIG. 1. As illustrated, the second diffraction grating 114 disperses the broadband light 108 by spatially separating it according to wavelength, resulting in the second dispersed wavelengths of light 108C. After being reflected from the first diffraction grating 114, the exit slit assembly 120 passes a second portion 108D of the second dispersed wavelengths of light 108C out from the enclosure 100.

It should be noted here that, although the diffractive surface of the first diffraction grating 112 may be aligned for rotation (i.e., on-axis) about the pivot point 116, the diffractive surface of the second diffraction grating 114 is offset by a distance from the pivot point 116 (i.e., off-axis). The processing circuitry 150 takes this distance, among other geometric characteristics and/or positions of the elements of the monochromator 10, into account when rotating the tandem diffraction grating 110. Thus, in various embodiments, one of the UV-VIS or NIR-IR gratings is utilized on-axis, and the other one of the UV-VIS or NIR-IR gratings is utilized off-axis. If the UV-VIS grating is used off-axis, it may be used with a standard shape of grating but special slewing characteristics specifically adapted for color measurements. In this context, some embodiments may rely upon a nominal bandwidth and resulting lineshape of the UV-VIS system to be approximately one-half that of the NIR-IR system.

As indicated above, according to aspects described herein, the processing circuitry 150 takes into account the spatial relationships (e.g., distances) between the grating surfaces of the first and second diffraction gratings 112 and 114 with respect to the entrance slit and the monochromatic wavelength incident on the exit slit. The processing circuitry 150 further controls the grating drive motor 140 to regulate the angular velocity of the tandem diffraction grating 110 based on the angular orientation of the tandem diffraction grating 110 and an offset distance between the pivot point 116 and a surface of the second diffraction grating 114. In this context, in one embodiment, the processing circuitry 150 controls the grating drive motor 140 to regulate a first angular velocity of the tandem diffraction grating 110 over a first range of motion for the first diffraction grating 112, and controls the grating drive motor 140 to regulate a second angular velocity of the tandem diffraction grating 110 over a second range of motion for the second diffraction grating 114. In other aspects, the processing circuitry 150 may knit together first data values detected by the detector 130 using light from the first diffraction grating 112 and second data values detected by the detector 130 using light from the second diffraction grating 114, to provide an aligned and smoothed spectrum of combined data values for storage and/or display on the display 160.

Figure 3:
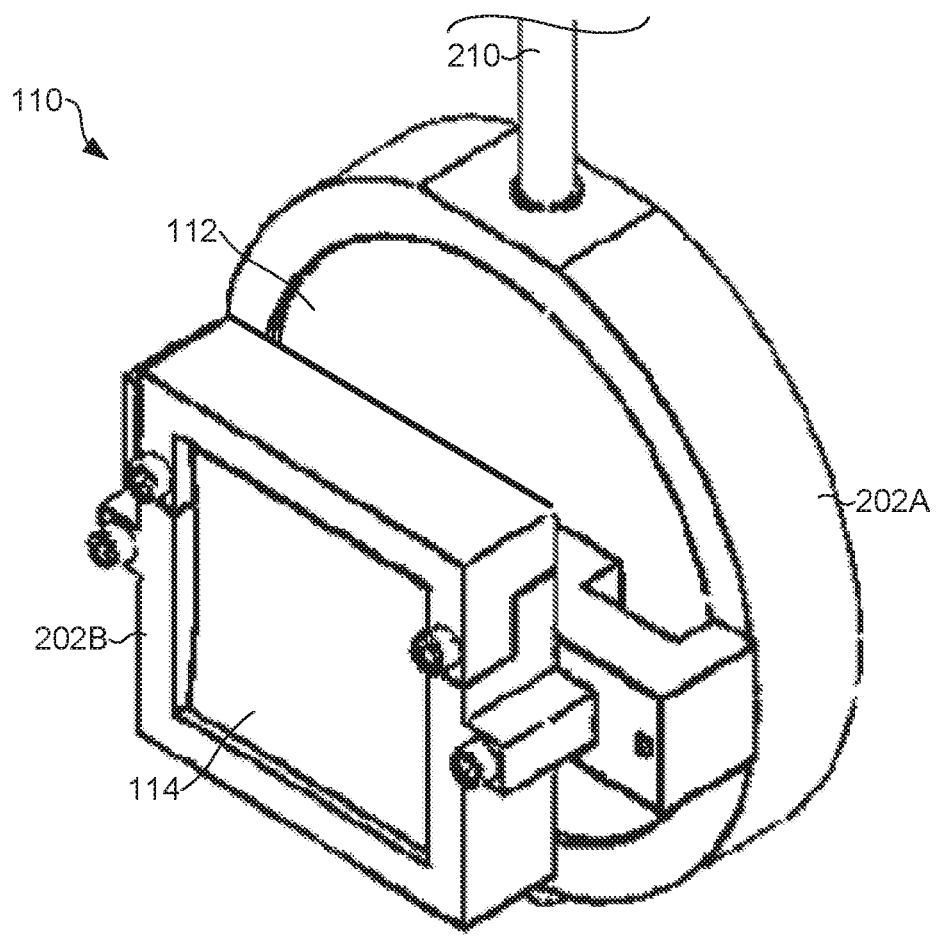
FIG. 3 illustrates a perspective view of an example tandem diffraction grating of the monochromator of FIG. 1 according to an embodiment described herein.

FIG. 3 illustrates a perspective view of the tandem diffraction grating 110 of the monochromator 10 of FIG. 1 according to an embodiment described herein. The tandem diffraction grating 110 includes a mounting assembly and first and second diffraction gratings 112 and 114. The mounting assembly includes a mount 202A for the first diffraction grating 112 and a mount 202B for the second diffraction grating 114. A cylindrical (or other suitable shape of) shaft 210 is attached to the mounting assembly, as illustrated in FIG. 3. The mounting assembly, including the mounts 202A and 202B for the first and second diffraction gratings 112 and 114, the cylindrical shaft 210, and any other associated hardware of the assembly (e.g., screws, bolts, etc.) may be formed from any material suitable for the application, such as stainless steel or other metals, for example. Generally, the materials for the mounting assembly should be selected so as to minimize flexibility in the mounting assembly, especially under change in angular acceleration. Such flexibility may translate into variations in the linearity or expected output of the dispersed wavelengths of light from the tandem diffraction grating 110. The cylindrical shaft 210 may be anchored at one or more distal ends via upper and/or lower shaft bearings. The construction for the mounting assembly of the tandem diffraction grating 110 is generally designed to assure precise, unwavering alignment.

Here, it is noted that the mounting assembly of the tandem diffraction grating 110 may be relied upon to upgrade or retrofit a monochromator for NIR-IR spectral regions to include a diffraction grating for UV-VIS spectral regions (or vice versa), by way of the addition of an additional diffraction grating. In connection with an additional detector and/or revised scanning instructions software, as needed, the elements of the instrument may remain the same while expanding the operating capabilities of the instrument.

Turning to FIGS. 4A and 4B, FIG. 4A illustrates a side view of the example tandem diffraction grating 110 of FIG. 3, and FIG. 4B illustrates a cutaway side view of the example tandem diffraction grating 110 of FIG. 3. As illustrated between FIGS. 4A and 4B, the mounts 202A and 202B hold and support the first and second diffraction gratings 112 and 114, so that the gratings 112 and 114 can be rotated by the grating drive motor 130. Also, FIGS. 4A and 4B illustrate that both the grating drive motor 130 and the grating position encoder 132 are coupled or attached to the cylindrical shaft 210. Here, as with the example illustrated in FIG. 3, it should be appreciated that the illustrated shape and dimensions of the tandem diffraction grating 110 and the first and second diffraction gratings 112 and 114 are provided by way of example only and not limitation (and may not be representative of all embodiments).

As can be seen in FIGS. 4A and 4B, centerlines 420A and 420B are drawn coincident to the surfaces of the first and second diffraction gratings 112 and 114, respectively. Also, it is noted that the centerline 420A of the first diffraction grating 112 is centered at the pivot point 116 (FIGS. 1 and 2). In FIGS. 4A and 4B, the distance "A" between the centerlines 420A and 420B is also illustrated. As outlined above, according to aspects described herein, the processing circuitry 150 accounts for the spatial relationships (e.g., distances) between the grating surfaces of the first and second diffraction gratings 112 and 114 (i.e., the distance "A") with respect to the entrance slit and the monochromatic wavelength incident on the exit slit. The processing circuitry 150 further controls the grating drive motor 140 to regulate the angular velocity of the tandem diffraction grating 110 based on the angular orientation of the tandem diffraction grating 110 and the offset distance "A" between the centerlines 420A and 420B.

Figure 5A:
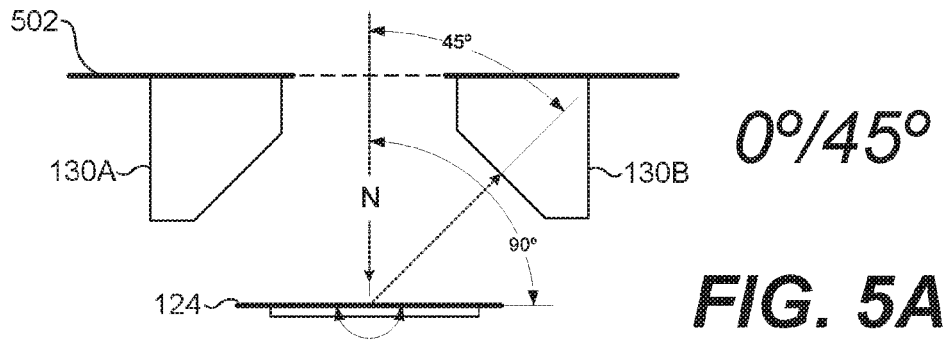
FIG. 5A illustrates an example geometry of a detector and sampling tray of the tandem dispersive range monochromator of FIG. 1 according to an embodiment described herein.
Figure 5B:
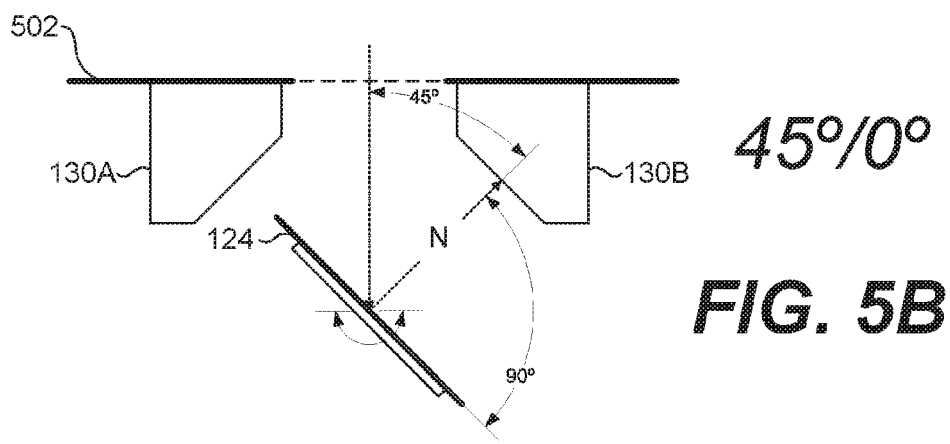
FIG. 5B illustrates a second geometry of the detector and sampling tray of FIG. 5A according to an embodiment described herein.
Figure 5C:
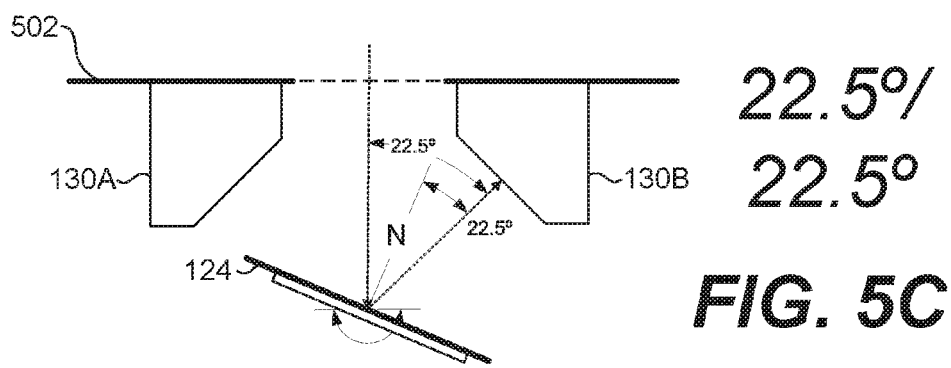
FIG. 5C illustrates a third geometry of the detector and sampling tray of FIG. 5A according to an embodiment described herein.

Turning to FIGS. 5A-5C, FIG. 5A illustrates an example geometry of the detector 130 and sampling tray 124 of the tandem dispersive range monochromator 10 of FIG. 1, FIG. 5B illustrates a second example of the geometry of the detector 130 and sampling tray 124, and FIG. 5C illustrates a third example of the geometry of the detector 130 and sampling tray 124. At the outset, it is noted that, in FIGS. 5A-5C, the detector 130 includes separate detectors 130A and 130B. The separate detectors 130A and 130B may be relied upon, respectively, for measurements of dispersed light from the first and second tandem diffraction gratings 112 and 114. In other words, to the extent that optical detectors vary in output response or responsivity over a certain wavelength range, the detector 130 may be embodied as separate detectors 130A and 130B, each configured for a suitable output response over a relatively narrow wavelength range and corresponding to one of the first and second tandem diffraction gratings 112 and 114.

As described below, the example geometry of the detector 130 and sampling tray 124 in FIG. 5A may be identified as a 0°/45° geometry, the example geometry of the detector 130 and sampling tray 124 in FIG. 5B may identified as a 45°/0° geometry, and the example geometry of the detector 130 and sampling tray 124 in FIG. 5C may identified as a 22.5°/22.5° geometry. These geometries are defined with reference to the angular difference between the incidence of light upon the sampling tray 124 as compared to the normal "N" of the sampling tray 124, and the angular difference between the normal "N" of the sampling tray 124 and the direction of light reflected into the detector 130.

It is noted that, for some measurements, such as measurements over the color or VIS spectrum, for example, the monochromator 10 may rotate the angle of the sampling tray 124 to vary the geometry between the sampling tray 124 and one or more of the detectors 130A or 130B. Thus, to the extent that the angle of incidence of light on a sample impacts the result of a measurement taken by the monochromator 10, the processing circuitry 150 may rotate the angular orientation of the sample tray 124 by control of the sample tray drive motor 126 to capture variations in the results. Further, the processing circuitry 150 may determine either a relative or absolute angular orientation of the sampling tray 124 based on feedback from the sample tray position encoder 128.

Figure 6A:
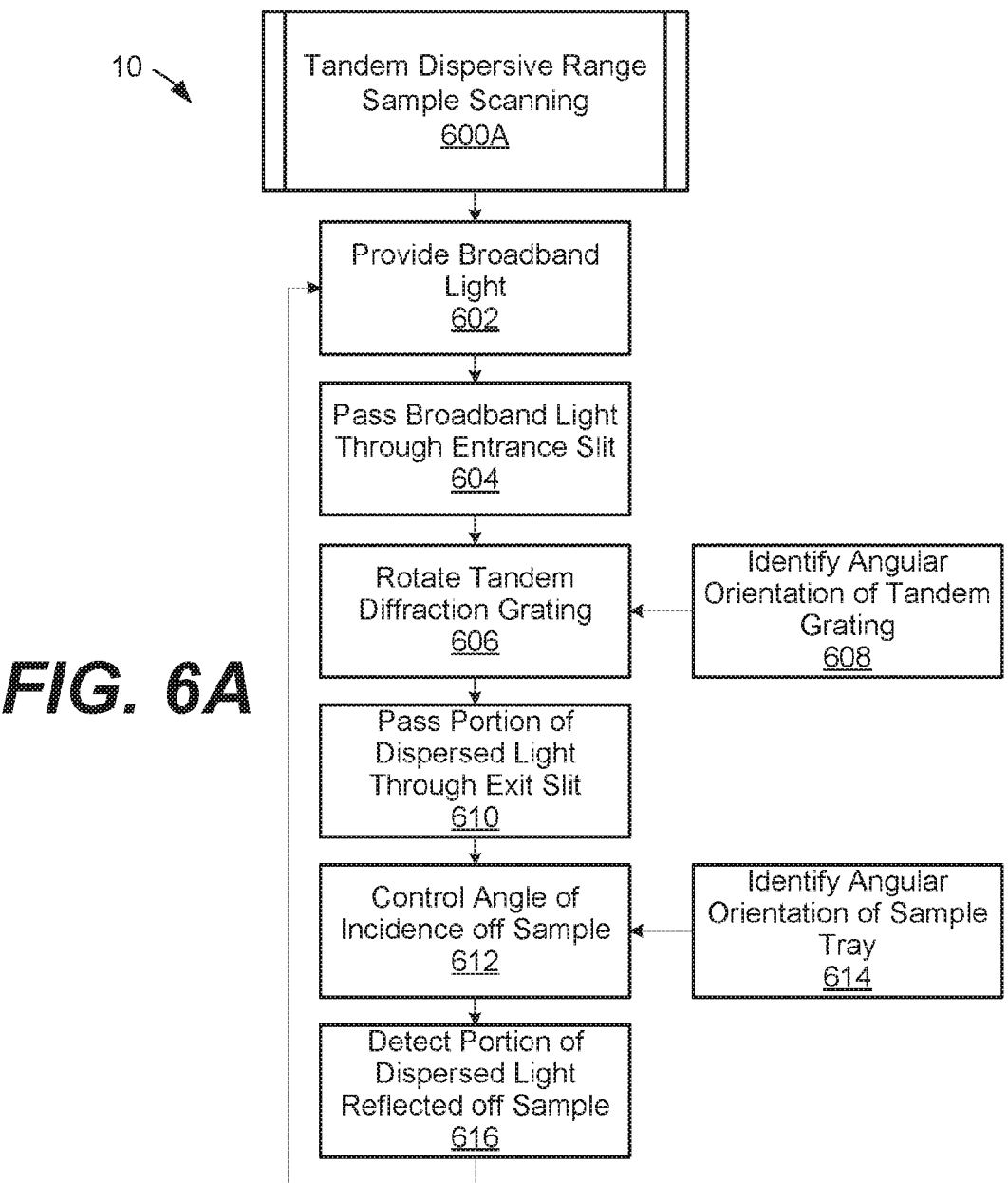
FIG. 6A illustrates an example flowchart of a process of tandem dispersive range sample scanning performed by the monochromator of FIG. 1 according to an embodiment described herein.
Figure 6B:
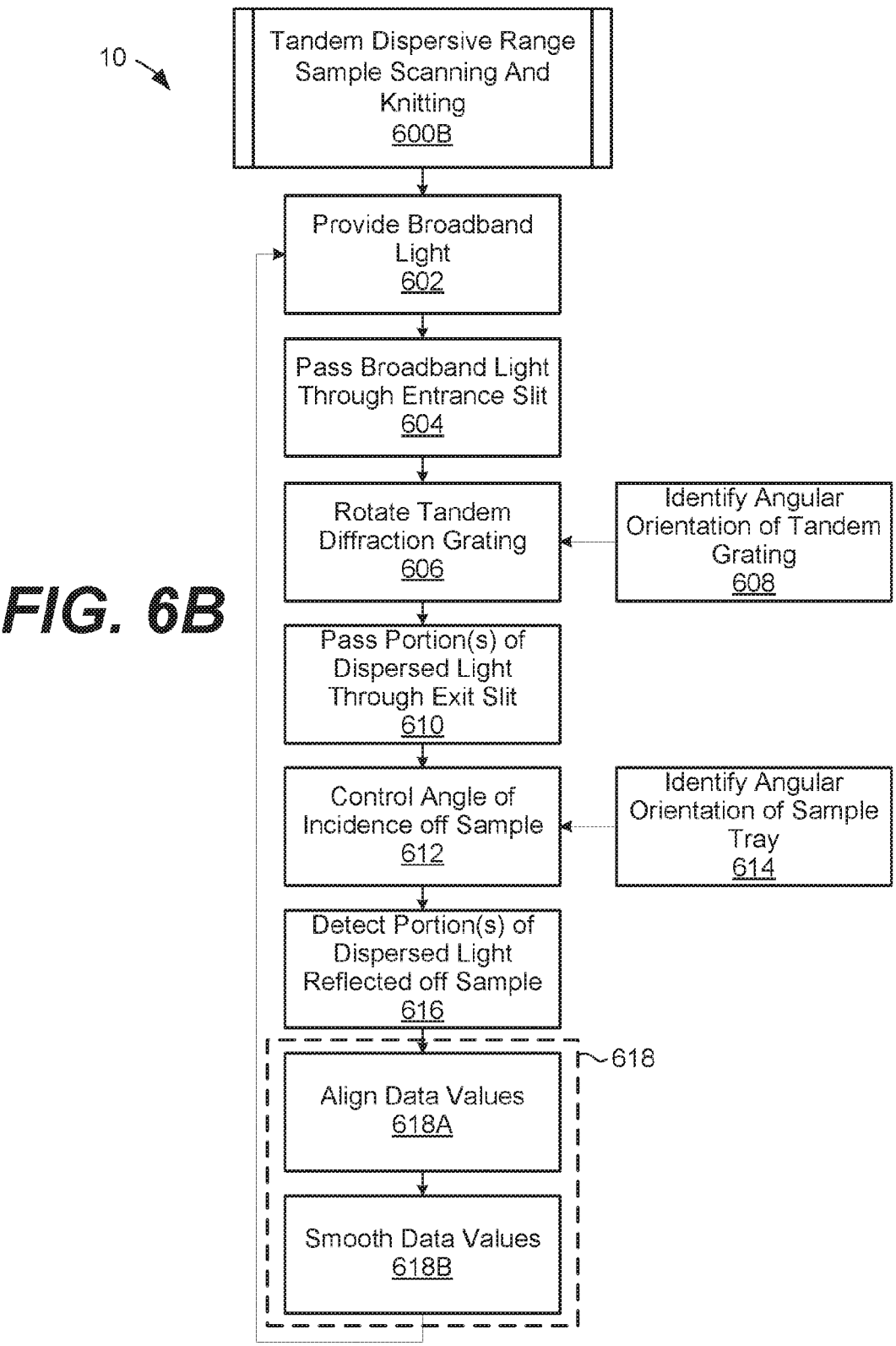
FIG. 6B illustrates an example flowchart of a process of tandem dispersive range sample scanning and knitting performed by the monochromator of FIG. 1 according to another embodiment described herein.

Referring next to FIGS. 6A and 6B, process flow diagrams illustrating example processes performed by the monochromator 10 of FIG. 1 are provided. It should be appreciated that the flowcharts of FIGS. 6A and 6B provide merely one example functional arrangement that may be employed to implement the operations of the monochromator 10, as described herein. In certain aspects, the flowcharts of FIGS. 6A and 6B may be viewed as depicting example steps performed by the monochromator 10 of FIG. 1. In alternative embodiments, another monochromator or other instrument similar to the monochromator 10 may perform the processes illustrated in FIG. 6A or 6B.

FIG. 6A illustrates an example flowchart of a process 600A of tandem dispersive range sample scanning performed by the monochromator 10 of FIG. 1 according to an embodiment described herein. At reference numeral 602, the process 600A includes providing and/or collimating broadband light. With reference to the example monochromator of FIG. 1 for context, the light may be provided and/or collimated by the light source 102 and the entrance optics assembly 104. At reference numeral 604, the process 600A includes passing at least a portion of the broadband light through an entrance slit, such as one in the entrance slit assembly 106.

At reference numeral 606, the process 600A includes rotating, by a grating drive motor, a tandem diffraction grating about a pivot point to provide dispersed wavelengths of light by diffraction of the portion of the broadband light. Here, the processing circuitry 150 may rotate the tandem diffraction grating 110 (FIG. 1) using the grating driver motor 140 based, in part, on the identification of an angular orientation of the tandem diffraction grating 110 using the grating position encoder 142 at reference numeral 608. The grating drive motor 140 may be controlled to regulate an angular velocity of the tandem diffraction grating 110 based on the angular orientation of the tandem diffraction grating 110.

The rotating at reference numeral 606 may include controlling the rotation by the processing circuitry 150 to regulate the angular velocity of the tandem diffraction grating 110 based on the angular orientation of the tandem diffraction grating 110 and an offset distance between the pivot point 116 and a surface of the second diffraction grating 112. Additionally or alternatively, the controlling may include controlling the grating drive motor 140 to regulate a first angular velocity of the tandem diffraction grating 110 over a first range of motion for the first diffraction grating 112 and to regulate a second angular velocity of the tandem diffraction grating 110 over a second range of motion for the second diffraction grating 114.

At reference numeral 610, the process 600A includes passing at least a portion of the dispersed wavelengths of light though an exit slit in the exit slit assembly 120, for example. At reference numeral 612, the process 600A includes controlling, by the sample tray drive motor 126, an angle of incidence of the portion of the dispersed wavelengths of light onto a sample on the sample tray 124, while controlling the grating drive motor 140 to regulate the first angular velocity of the tandem diffraction grating 110 over the first range of motion. The controlling at reference numeral 612 may be based, in part, on the identification of an angular orientation of the sample tray 124 using the sample tray position encoder 128 at reference numeral 614.

At reference numeral 616, the process 600A includes detecting the dispersed wavelengths of light and/or a reflection thereof (e.g., reflection off sample). The detection may be achieved by the detector 130, which provides an electrical signal to the processing circuitry 150 representative of an intensity, for example, of the dispersed wavelengths of light and/or reflection thereof. The process 600A may repeat over time, as needed, so that the monochromator can perform various measurements, as directed by a user. It is noted that, depending upon the type of measurement being performed, only one or both halves of the tandem diffraction grating 110 may be rotated or oscillated into or about the path of the broadband light. In other words, the processing circuitry 150 may be programmed and configured to perform any type of measurement using one or both of the different diffraction gratings of the tandem diffraction grating 110, while taking into account the particular requirements for such measurements.

In other aspects, the process 600A may include one or more black background scans or calibration scans before or after a live scan. A background scan may be accomplished with the shutter of the entrance slit assembly 106 closed, and a calibration scan may be accomplished using a standard sample.

FIG. 6B illustrates an example flowchart of a process 600B performed by the monochromator 10 of FIG. 1 according to another embodiment described herein. In the process 600B, reference numerals 602, 604, 606, 608, 610, 612, 614, and 616 include processes similar to those in FIG. 6A. It is noted that, at reference numeral 616, the process 600B includes detecting a first reflection (e.g., reflection off a sample) of at least a portion of first dispersed wavelengths of light and a second reflection of at least a portion of second dispersed wavelengths of light. The detection may be achieved by the detector 130, which provides an electrical signal and/or data values representative of an intensity, for example, of the dispersed wavelengths of light and/or the reflection thereof. Particularly, at reference numeral 616, the detector 130 may detect a first reflection of at least the portion 108B of the first dispersed wavelengths of light 108A from the first diffraction grating 112 (FIG. 1). The intensity of the first reflection is representative of the absorbance of the portion 108B of light 108A by the sample on the sample tray 124. The detector 130 may also detect a second reflection of at least the portion 108D of the second dispersed wavelengths of light 108C from the second diffraction grating 114 (FIG. 2). The intensity of the second reflection is representative of the absorbance of the portion 108D of light 108C by the sample on the sample tray 124.

Figure 7:
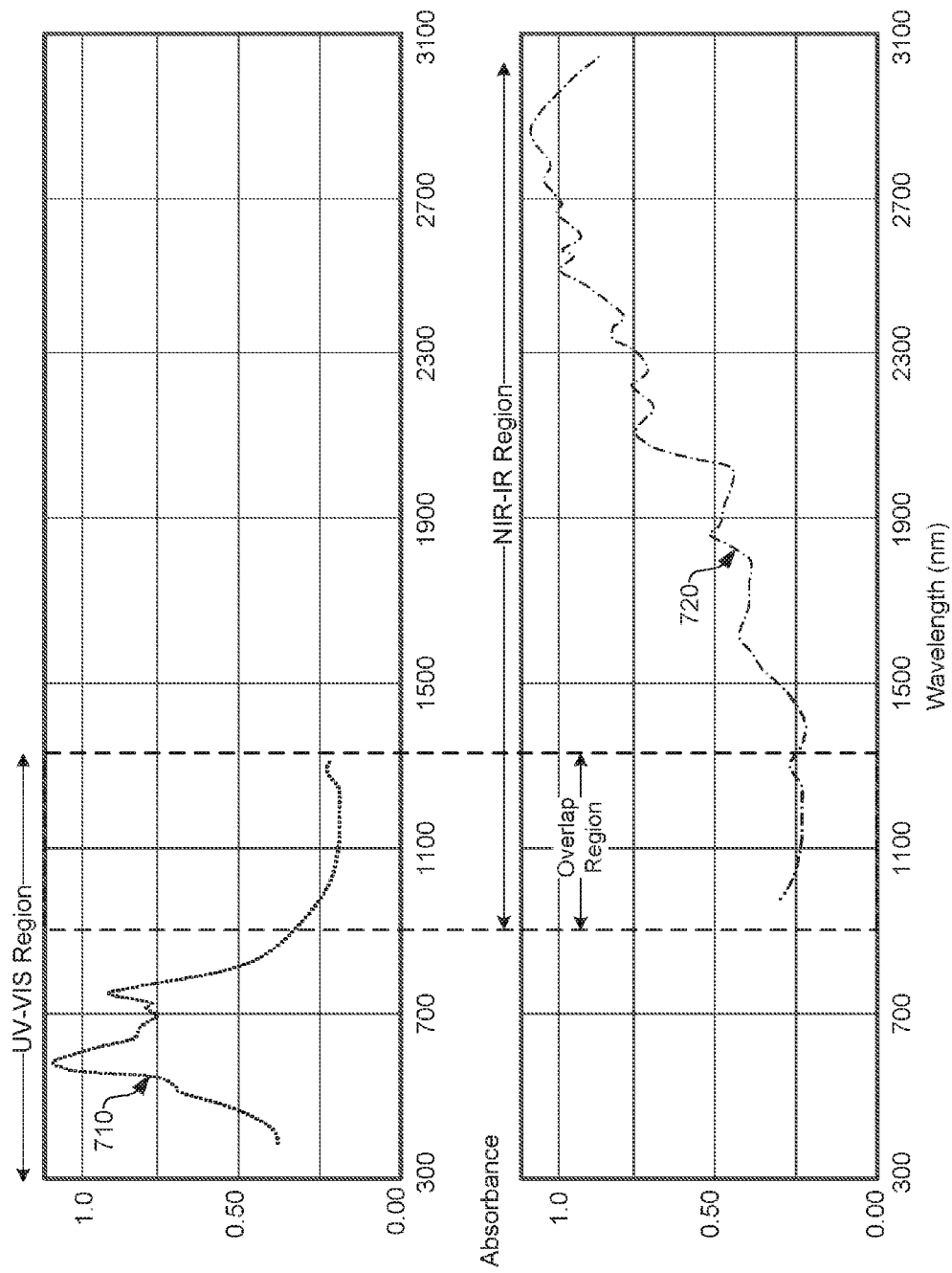
FIG. 7 illustrates example data values from a first reflection of first dispersed wavelengths of light and data values from a second reflection of second dispersed wavelengths of light.

Turning to FIG. 7, data values captured by the detector 130 from the first reflection, in the UV-VIS spectrum, are plotted on the top frame as the first spectrum 710. Data values captured by the detector 130 from the second reflection, in the NIR-IR spectrum, are plotted on the top frame as the second spectrum 720. It should be appreciated that the data values in FIG. 7 (and in FIGS. 8A, 8B, and 9) are provided by way of example only. As illustrated, at least part of the spectrum 710 overlaps with the spectrum 720.

According to aspects of the embodiments, at reference numeral 618, the process 600B includes knitting together data values from the first reflection (i.e., from the first spectrum 710) and data values from the second reflection (i.e., from the second spectrum 720) to provide a spectrum of combined data values. At reference numeral 618, the processing circuitry 150 of the monochromator 10 may knit together the spectrum 710 with the spectrum 720, to provide an aligned, smoothed, and combined spectrum of data values for storage and/or display on the display 160, for example.

In one embodiment, the knitting at reference numeral 618 may include aligning data values from the first reflection with data values from the second reflection at reference numeral 618A and smoothing at least a portion of the data values from the first reflection with at least a portion of the data values from the second reflection at reference numeral 618B.

Figure 8A:
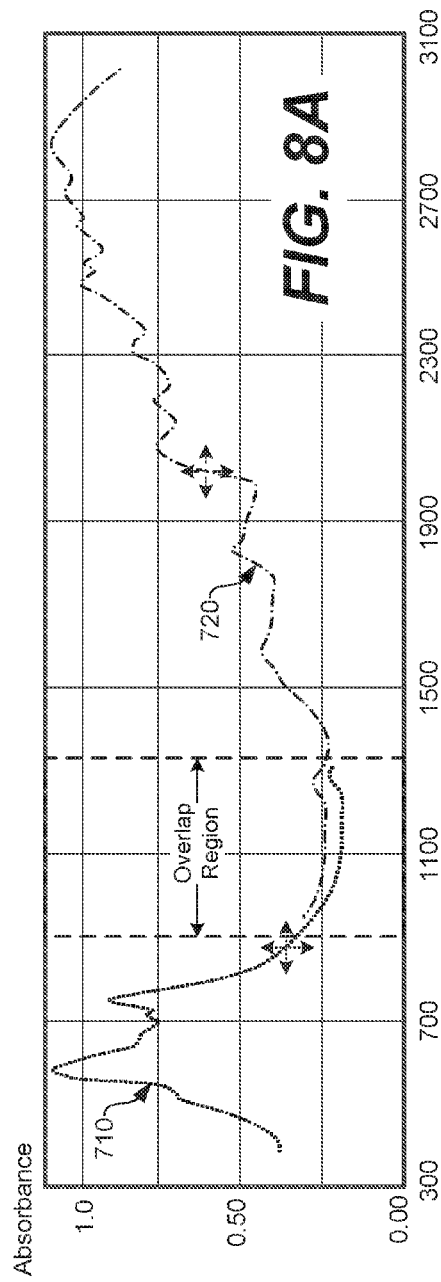
FIG. 8A illustrates an example of aligning data values from the first reflection and data values from the second reflection.

Turning to FIG. 8A, an example of aligning data values at reference numeral 618A from the first reflection, spectrum 710, and data values from the second reflection, spectrum 720, is illustrated. Here, the processing circuitry 150 may refer to and compare data values in the spectrum 710 and the spectrum 720 which overlap in spectral range, to identify a correlation in change among the data values. For example, the processing circuitry 150 may identify a similar amount of change between in absorbance between individual, consecutive data values for the spectrum 710 and the spectrum 720, across wavelength. In other words, the processing circuitry 150 may identify a similar absorbance envelope of the spectrum 710 as compared to the spectrum 720, although the data values in the envelopes may not be aligned in absorbance value or wavelength position.

Figure 8B:
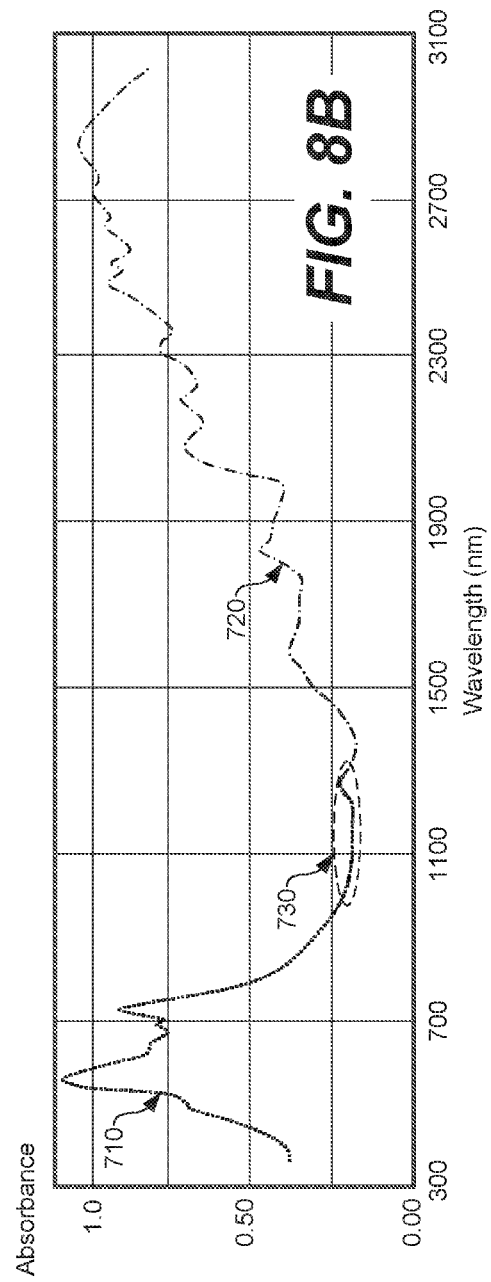
FIG. 8B illustrates an example of smoothing data values from the first reflection and data values from the second reflection.

Once a correlation in the envelopes of the spectrums 710 and 720 is identified (at least over the overlapping region of wavelength between them), an amount of absorbance difference (e.g., in the X direction in FIG. 8A) and an amount of wavelength difference (e.g., in the Y direction in FIG. 8A) between the envelopes may be calculated by the processing circuitry 150. The processing circuitry 150 may then align the data values in the first spectrum 710 with the data values from the second spectrum 720 by subtracting the difference from (or adding the difference to) one of the two spectrums 710 or 720. Alternatively, each of the two spectrums 710 or 720 may be adjusted by half the difference. After the aligning at reference numeral 618A, the spectrums 710 and 720 may more closely align with each other, as illustrated in FIG. 8B.

After the aligning at reference numeral 618A, the process 600B includes smoothing at reference numeral 618B. At reference numeral 618B, if multiple data values exist in the overlapping area 730 (FIG. 8B) of the two spectrums 710 or 720, the multiple data values may be smoothed or combined at reference numeral 618B. For example, if a data value is available at a particular wavelength for both the spectrum 710 and the spectrum 720, the two data values may be smoothed or combined by averaging them. In some embodiments, a mathematical spline or other smoothing function may be applied across the data values in the overlapping area 730 after pairs of data values at particular wavelengths have been averaged.

Figure 9:
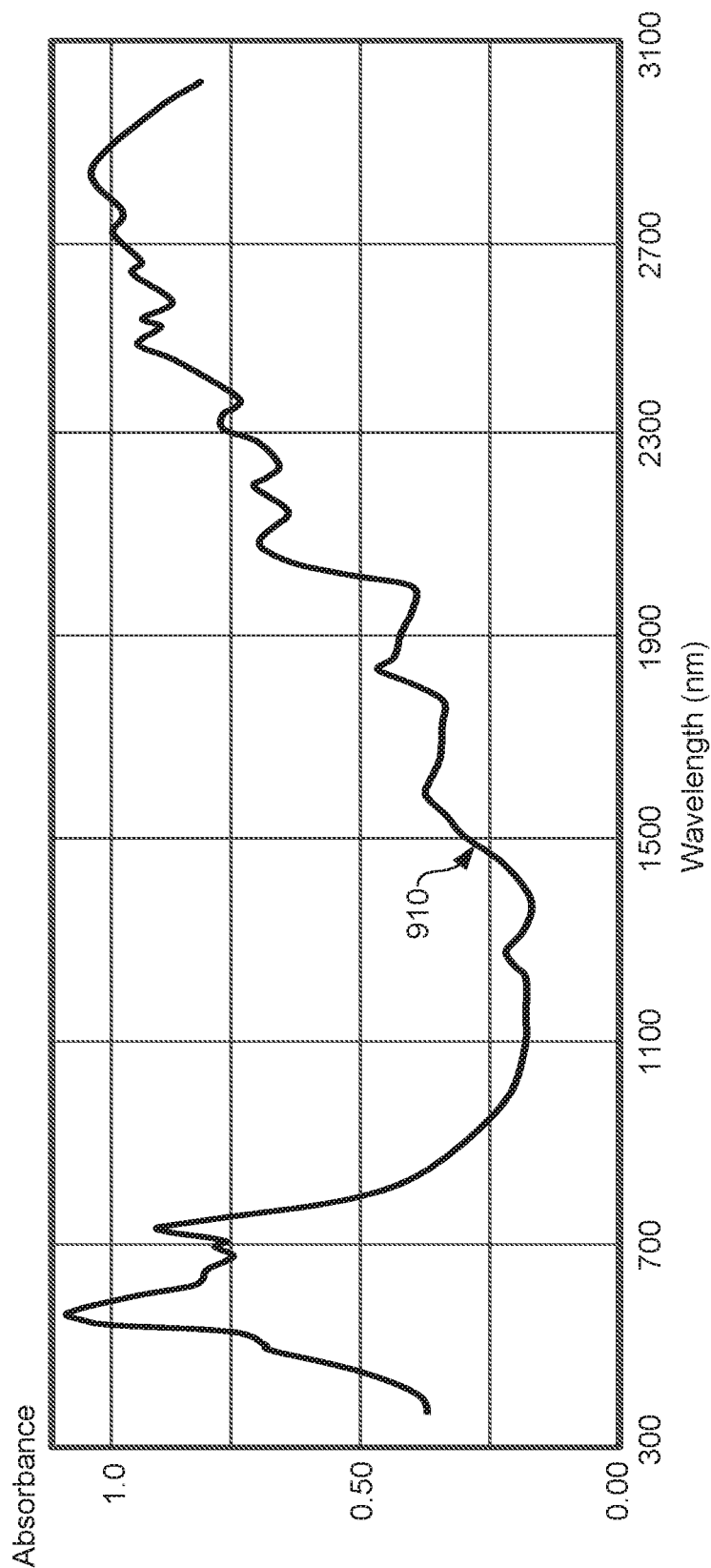
FIG. 9 illustrates an example spectrum of combined data values provided by the monochromator of FIG. 1 according to another embodiment described herein.

FIG. 9 illustrates an example combined spectrum 910 of combined data values provided by the monochromator 10 of FIG. 1. The combined spectrum 910 is representative of the combination of the spectrums 710 and 720, using the process of knitting 618 in FIG. 6B and described above. The combined spectrum 910 may be provided on a display, such as the display 160, for example. By using the tandem grating 110 and knitting together the results captured from light reflected using the first and second diffraction gratings 112 and 114, the need for two separate monochromators may be averted. Particularly, the monochromator 10 can be relied upon to make relatively high quality, combined spectroscopic measurements over the UV-VIS-NIR-IR range of 190 nanometers to 3000 nanometers, for example. This results in less overall cost as compared to using separate monochromators, respectively, for the UV-VIS and NIR-IR ranges, in a smaller footprint.

Figure 10:
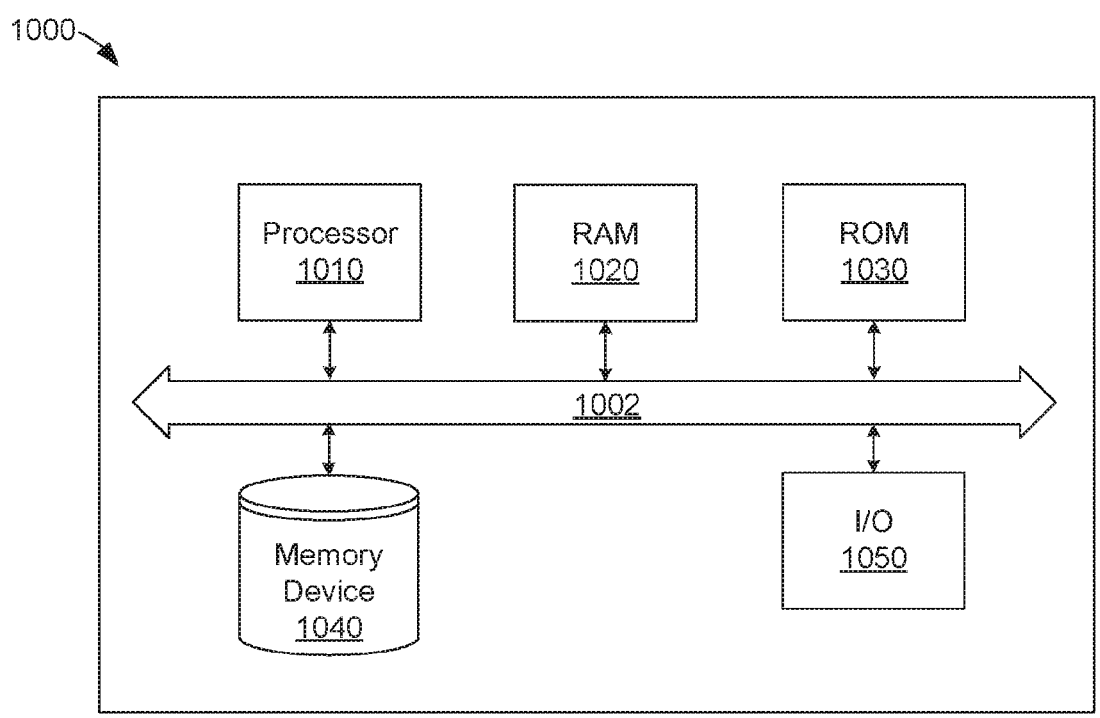
FIG. 10 illustrates an example schematic block diagram of a processing circuitry environment which may be employed in the monochromator of FIG. 1 according to an embodiment described herein.

FIG. 10 illustrates an example schematic block diagram of a processing circuitry environment 1000 which may be employed for the processing circuitry 150 in the monochromator 10 of FIG. 1 according to an embodiment described herein. The circuitry environment 1000 may be embodied, in part, using one or more elements of a general purpose computer. The circuitry environment 1000 includes a processor 1010, a Random Access Memory (RAM) 1020, a Read Only Memory (ROM) 1030, a memory device 1040, and an Input Output ("I/O") interface 1050. The elements of the circuitry environment 1000 are communicatively coupled via a local interface 1002. The elements of the circuitry environment 1000 described herein are not intended to be limiting in nature, and the circuitry environment 1000 may include other elements.

In various embodiments, the processor 1010 may comprise any well-known general purpose arithmetic processor, programmable logic device, state machine, or Application Specific Integrated Circuit (ASIC), for example. The processor 1010 may include one or more circuits, one or more microprocessors, ASICs, dedicated hardware, or any combination thereof. In certain aspects embodiments, the processor 1010 is configured to execute one or more software modules. The processor 1010 may further include memory configured to store instructions and/or code to various functions, as further described herein. In certain embodiments, the processor 1010 may comprise a general purpose, state machine, or ASIC processor, and the processes 600A and 600B described in FIGS. 6A and 6B, respectively, may be implemented or executed by the general purpose, state machine, or ASIC processor according software execution, by firmware, or a combination of a software execution and firmware.

The RAM and ROM 1020 and 1030 comprise any well-known random access and read only memory devices that store computer-readable instructions to be executed by the processor 1010. The memory device 1040 stores computer-readable instructions thereon that, when executed by the processor 1010, direct the processor 1010 to execute various aspects of the embodiments described herein.

As a non-limiting example group, the memory device 1040 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The I/O interface 1050 comprises device input and output interfaces such as keyboard, pointing device, display, communication, and/or other interfaces, such as a network interface, for example. The local interface 1002 electrically and communicatively couples the processor 1010, the RAM 1020, the ROM 1030, the memory device 1040, and the I/O interface 1050, so that data and instructions may be communicated among them.

In certain aspects, the processor 1010 is configured to retrieve computer-readable instructions and data stored on the memory device 1040, the RAM 1020, the ROM 1030, and/or other storage means, and copy the computer-readable instructions to the RAM 1020 or the ROM 1030 for execution, for example. The processor 1010 is further configured to execute the computer-readable instructions to implement various aspects and features of the embodiments described herein. For example, the processor 1010 may be adapted or configured to execute the processes described above with reference to FIGS. 6A and 6B.

The flowcharts or processes of FIGS. 6A and 6B are representative of certain processes, functionality, and operations of embodiments discussed herein. Each block may represent one or a combination of steps or executions in a process. Alternatively or additionally, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the processor 710. The machine code may be converted from the source code, etc. Further, each block may represent, or be connected with, a circuit or a number of interconnected circuits to implement a certain logical function or process step.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

At least the following is claimed:

1. A monochromator, comprising:
   a diffraction grating;
   a grating drive motor that rotates the diffraction grating to provide, by diffraction of light, first dispersed wavelengths of light and second dispersed wavelengths of light from the diffraction grating;
   a detector configured to detect first data values for a first reflection of the first dispersed wavelengths of light and second data values for a second reflection of the second dispersed wavelengths of light, wherein at least a portion of the first data values overlap in an overlapping area of wavelength with at least a portion of the second data values; and
   processing circuitry configured to:
      identify at least one of a difference in absorbance or a difference in wavelength between the first data values for the first reflection and the second data values for the second reflection; and
      reduce at least one of the difference in absorbance or the difference in wavelength between the first data values and the second data values to provide a spectrum of combined data values.

2. The monochromator of claim 1, wherein the processing circuitry is further configured to adjust at least one of a portion of the first data values or a portion of the second data values in absorbance to reduce the difference in absorbance.

3. The monochromator of claim 1, wherein the processing circuitry is further configured to adjust the first data values and the second data values in wavelength to reduce the difference in wavelength.

4. The monochromator of claim 1, wherein the processing circuitry is further configured to adjust at least one of the first data values or the second data values in wavelength to reduce the difference in wavelength.

5. The monochromator of claim 4, wherein the processing circuitry is further configured to, after at least one of the first data values or the second data values are adjusted in wavelength, average the portion of the first data values and the portion of the second data values in the overlapping area to reduce the difference in absorbance.

6. The monochromator of claim 1, wherein the diffraction grating comprises a first periodic surface region and a second periodic surface region.

7. The monochromator of claim 1, wherein the diffraction grating comprises a tandem diffraction grating, the tandem diffraction grating comprising a first diffraction grating, a second diffraction grating, and a mounting assembly having a rotatable shaft to rotate the tandem diffraction grating.

8. The monochromator of claim 7, wherein:
   the first diffraction grating comprises a first periodic surface for a first range of ultra-violet (UV) to visible (VIS) wavelengths of the light; and
   the second diffraction grating comprises a second periodic surface for a second range of near-infrared (NIR) to infrared (IR) wavelengths of the light.

9. A method, comprising:
   rotating, by a grating drive motor, a diffraction grating to provide first dispersed wavelengths of light and second dispersed wavelengths of light from the diffraction grating;
   detecting, by a detector, first data values for a first reflection of the first dispersed wavelengths of light and second data values for a second reflection of the second dispersed wavelengths of light, wherein at least a portion of the first data values overlap in an overlapping area of wavelength with at least a portion of the second data values;
   identifying, with processing circuitry, at least one of a difference in absorbance or a difference in wavelength between the first data values for the first reflection and the second data values for the second reflection in the overlapping region; and
   reducing, with the processing circuitry, at least one of the difference in absorbance or the difference in wavelength between the first data values and the second data values to provide a spectrum of combined data values.

10. The method of claim 9, further comprising adjusting, with the processing circuitry, at least one of a portion of the first data values or a portion of the second data values in absorbance to reduce the difference in absorbance.

11. The method of claim 9, further comprising adjusting, with the processing circuitry, at least one of the first data values or the second data values in wavelength to reduce the difference in wavelength.

12. The method of claim 11, further comprising, after the adjusting, averaging, with the processing circuitry, the portion of the first data values and the portion of the second data values in the overlapping area to reduce the difference in absorbance.

13. The method of claim 9, wherein the diffraction grating comprises a first periodic surface region and a second periodic surface region.

14. A monochromator, comprising:
   a diffraction grating;
   a grating drive motor that rotates the diffraction grating to provide, by diffraction of light, first dispersed wavelengths of light and second dispersed wavelengths of light from the diffraction grating;
   a detector configured to detect first data values for a first reflection of the first dispersed wavelengths of light and second data values for a second reflection of the second dispersed wavelengths of light; and processing circuitry configured to:
- identify a correlation between a first envelope of a portion of the first data values for the first reflection and a second envelope of a portion of the second data values for the second reflection;
- calculate at least one of a difference in absorbance or a difference in wavelength between the first envelope and the second envelope; and
- reduce at least one of the difference in absorbance or the difference in wavelength to provide a spectrum of combined data values.

15. The monochromator of claim 14, wherein the processing circuitry is further configured to adjust at least one of the first data values or the second data values in wavelength to reduce the difference in wavelength.

16. The monochromator of claim 15, wherein the processing circuitry is further configured to, after at least one of the first data values or the second data values are adjusted in wavelength, average the portion of the first data values and the portion of the second data values to reduce the difference in absorbance.

17. The monochromator of claim 14, wherein the diffraction grating comprises a first periodic surface region and a second periodic surface region.

\* \* \* \* \*